United States Patent [19]

Takamatsu

[11] 4,003,599
[45] Jan. 18, 1977

[54] SAFETY HEAD-REST

[75] Inventor: Ikuo Takamatsu, Uozu, Japan

[73] Assignee: Yoshida Kogyo Kabushiki Kaisha, Tokyo, Japan

[22] Filed: Jan. 22, 1976

[21] Appl. No.: 651,438

[30] Foreign Application Priority Data

Jan. 27, 1975 Japan .................. 50-12741[U]

[52] U.S. Cl. .............. 297/220; 297/218; 297/391
[51] Int. Cl.² ................................. A61G 15/00
[58] Field of Search ............ 297/220, 391, 218; 24/205 R, 205 B, 205.1 R

[56] References Cited

UNITED STATES PATENTS

| | | | |
|---|---|---|---|
| 3,114,527 | 12/1963 | Demarest | 297/391 UX |
| 3,480,976 | 12/1969 | Yavner | 297/391 X |
| 3,900,926 | 8/1975 | Takahashi et al. | 24/205 R |

Primary Examiner—James C. Mitchell
Attorney, Agent, or Firm—Dennison, Dennison, Meserole & Pollack

[57] ABSTRACT

A safety head-rest for an automobile seat or the like is provided with a sliding clasp fastener secured to marginal edges of an opening defined by two substantially identical halves constituting a head-rest body, one of said halves having an aperture for receiving a support post adapted to connect the head-rest to the seat.

4 Claims, 6 Drawing Figures

SAFETY HEAD-REST

BACKGROUND OF THE INVENTION

This invention relates to improvements in and relating to safety head-rests or pillows such as are attached to seats in automobiles, air-crafts and the like.

Seats installed for example in automobiles are provided nowadays almost always with head-rests either integral with or separable from the seats with a view to protecting the passengers against shock or injury in the event of an accident.

SUMMARY OF THE INVENTION

The present invention is directed to a safety head-rest of the type which contains suitable cushioning or shock absorbing materials and which is secured by an elongated post or posts in supported relation to an automobile seat, and has for its object to provide a safety head-rest of this character which is extremely easy to assemble onto an automobile seat and which has a crease-free, attractive appearance.

Briefly stated, the safety head-rest according to the invention comprises a generally bag-shaped hollow body made of cloth, leather or other suitable covering materials and having two split portions defining therebetween a peripheral opening, and a sliding clasp fastener attached to marginal edges of said opening and adapted to take said two split portions into and out of engagement, one of said split portions having an aperture for receiving a support post. The hollow body is filled with a suitable packing material and thereafter sealed by joining the split portions together through the action of the sliding clasp fastener.

The invention will be better understood from the following description taken in connection with the accompanying drawings which illustrate by way of example certain preferred embodiments which the invention may assume in practice.

DETAILED DESCRIPTION OF THE PREFERRED EMBODIMENTS

Figure 1:
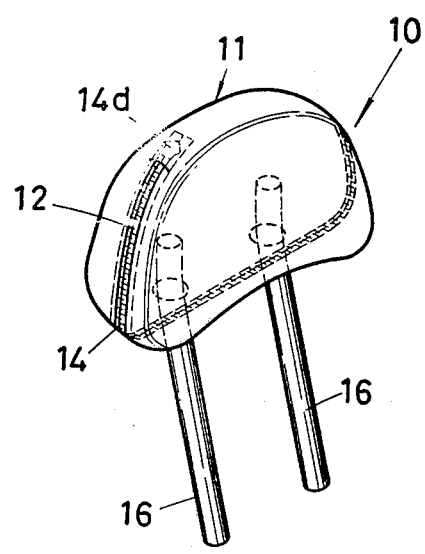
FIG. 1 is a perspective view of a safety head-rest provided in accordance with a preferred embodiment of the invention.
Figure 2:
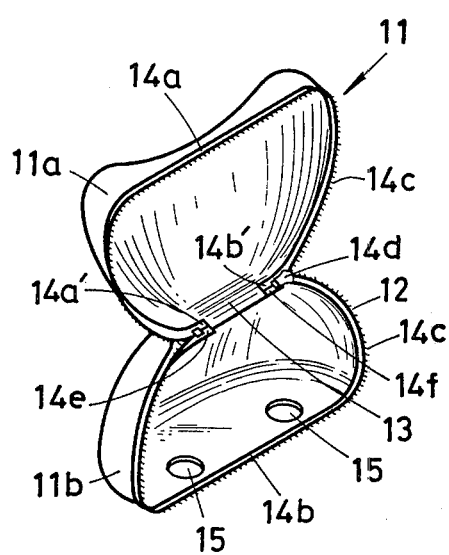
FIG. 2 is a perspective view showing the head-rest body split open.

Referring now to the drawings and FIGS. 1 and 2 in particular, there is shown a safety head-rest 10 provided in accordance with a preferred embodiment of the invention. The safety head-rest 10 comprises a generally bag-shaped hollow body 11 made of cloth, leather or other suitable covering materials and consisting of two substantially identical split-portions 11a and 11b defining therebetween a peripheral opening 12 which terminates at a connecting portion 13. The connecting portion 13 serves an axis of fold about which one of the split-portions 11a, 11b is folded upon the other when the head-rest body 11 is closed and sealed in a manner hereinafter described. Designated at 14 is a sliding clasp fastener of a standard type comprising a pair of opposed stringers 14a, and 14b each carrying a row of interlocking fastener elements 14c, and slider 14d movable along and adapted to take the two rows of fastener elements 14c of the two stringers 14a, 14b into and out of engagement, and end stops 14e, and 14f adapted to stop the slider 14d thereat. The sliding clasp fastener 14 is secured as by sewn stitches not shown to and along the marginal edges of the peripheral opening 12, in which instance both terminal end portions 14a', 14b' of the stringers 14a, 14b including the end stops 14e, 14f are extended unsewn a length beyond the terminal ends of the opening 12 into the connecting portion 13 of the body 11, the arrangement being that the slider 14d can move into the region of the connecting portion 13 and thus take into engagement the end portions 14a', 14b' of the stringers 14a, 14b that have been left unsewn or free whereby the head-rest body 11 can be closed and sealed completely without the terminal ends of the opening 12 being slackened or creased, and furthermore the slider 14d and end stops 14e, 14f can be concealed from external view.

There are provided apertures 15 in the bottom of one split-portion 11b of the head-rest body 11 which is slightly larger than the other split-portion 11a. The apertures 15 are adapted to receive therein support parts 16 which are in turn adapted to connect and support the head-rest 10 onto a seat (not shown) such as installed in an automobile.

Figure 3:
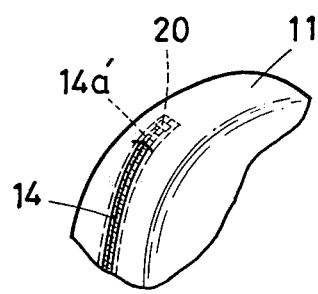
FIG. 3 is a perspective view of a portion of the head-rest body which is provided with an external end stop.

Since it is not always necessary to open the head-rest 10 after it has been sealed, the slider 14d may be, after closing the fastener 14, removed from one end thereof, and said one end may be provided with a suitable end stop 20 with which to secure the fastener 14 to the head-rest 10 as shown in FIG. 3.

Figure 4:
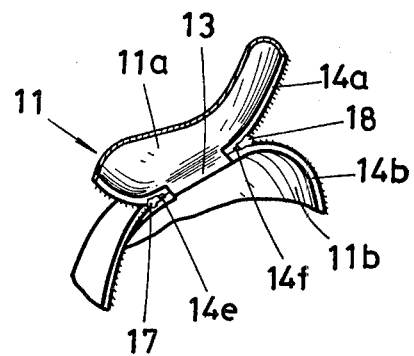
FIG. 4 is a perspective view of a portion of the head-rest body which is provided with a pair of sliders.
Figure 5:
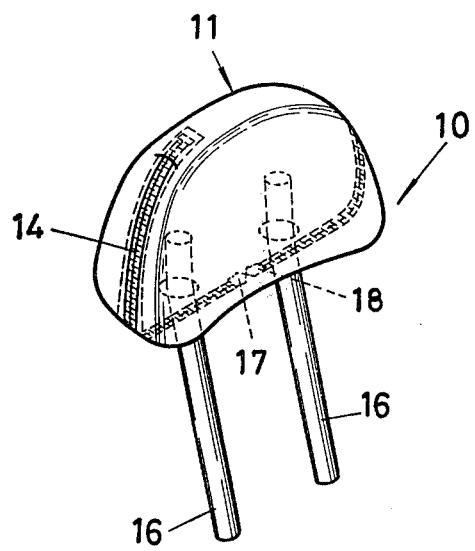
FIG. 5 is a view similar to FIG. 1 but showing the two split portions joined together with the use of a pair of sliders.

Alternatively, there may be provided a pair of sliders 17, 18 for closing the fastener 14 from both ends as shown in FIGS. 4 and 5. The two sliders 17, 18 may be brought into abutting engagement with each other preferably at midpart of the fastener 14 or intermediate the two apertures 15.

Figure 6:
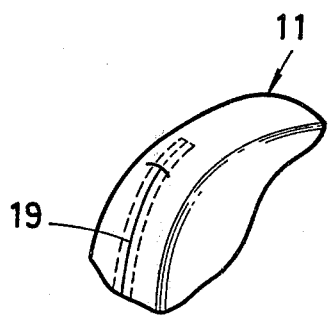
FIG. 6 is a perspective view of the head-rest body provided with a concealed or masked type sliding clasp fastener.

Further alternatively, there may be employed a concealed or masked type sliding clasp fastener 19 as shown in FIG. 6 in place of the standard fastener 14 to provide a seamless joint between the two split-portions 11a, 11b of the head-rest 10, with the fastener elements concealed from external view thus to improve the appearance of the head-rest 10 as a whole.

What is claimed is:

1. In a safety head-rest having a filling core and a generally vertical, elongated support member supporting the filling core at its upper end, and wherein said head-rest is particularly adapted to engage and project vertically above an automobile or like seat;
   a. a generally bag-shaped hollow body having two substantially identical portions split along the periphery of the body to define a peripheral opening therebetween, and an elongated connecting portion, along a minor portion of the periphery of the body, connecting said two split portions at their upper portions to interrupt said peripheral opening, one of said two split portions having an aperture formed through its lower portion in closely spaced relation to said peripheral opening for receiving the support member therethrough, said connecting portion serving as an axis of fold about which one of the split portions can be folded upon the other to facilitate insertion of the filling core into the body; and b. a slide fastener having a slider, opposed stringers, and end stops, said opposed stringers being secured to the marginal edges along the complete length of said peripheral opening, said slider being movable along the said opposed stringers to close said peripheral opening.

2. A safety head-rest as defined in claim 1 wherein said stringers have both ends extending unsewn below said connecting portion for a length sufficient to conceal the slider and end stops from external view.

3. A safety head-rest as defined in claim 1 wherein the slider is removed and replaced by an end stop.

4. A safety head-rest as defined in claim 1 wherein a pair of sliders are provided for closing the fastener stringers from both ends.

* * * * *